T. H. MILLINGTON.
POWER TRANSMITTING MEANS FOR MOTOR DRIVEN VEHICLES.
APPLICATION FILED MAR. 22, 1916. RENEWED MAY 11, 1917.
1,273,519.
Patented July 23, 1918.
3 SHEETS—SHEET 2.
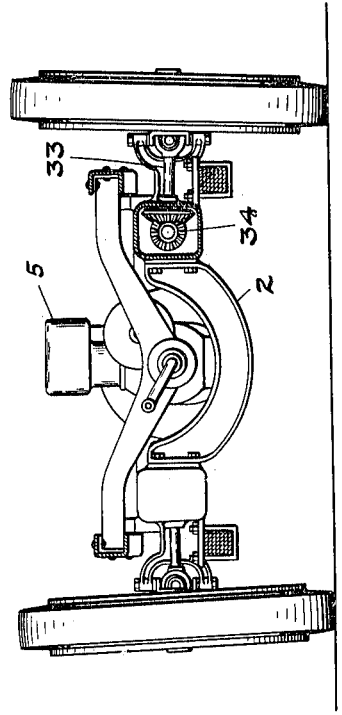
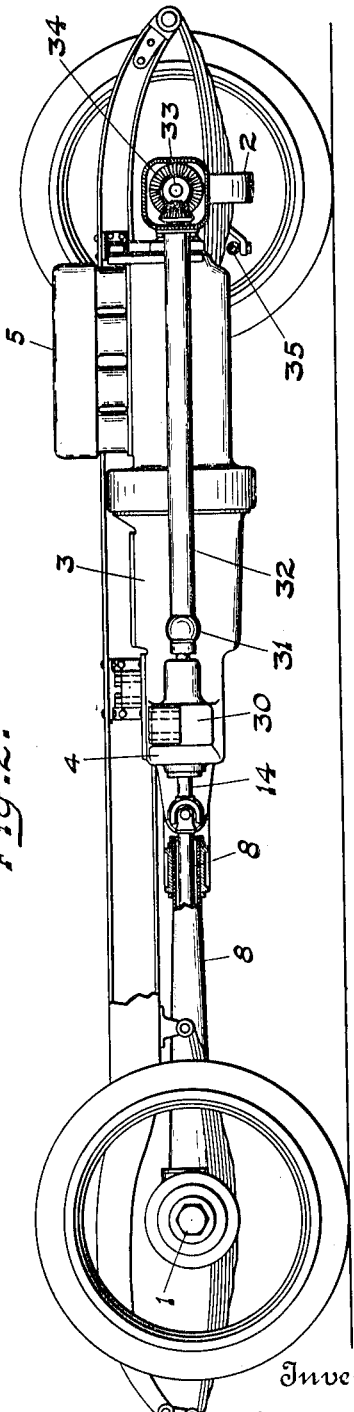

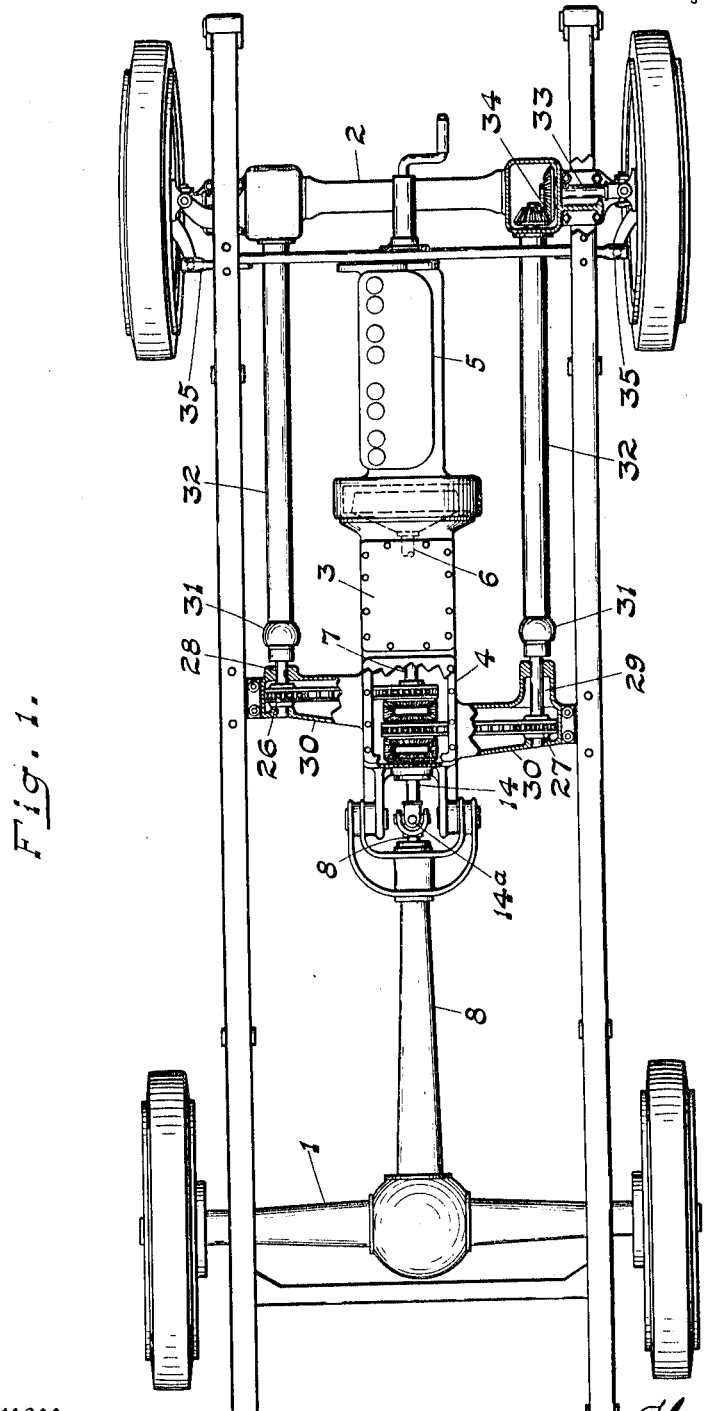

T. H. MILLINGTON.
POWER TRANSMITTING MEANS FOR MOTOR DRIVEN VEHICLES.
APPLICATION FILED MAR. 22, 1916. RENEWED MAY 11, 1917.
1,273,519.
Patented July 23, 1918.
3 SHEETS—SHEET 3.
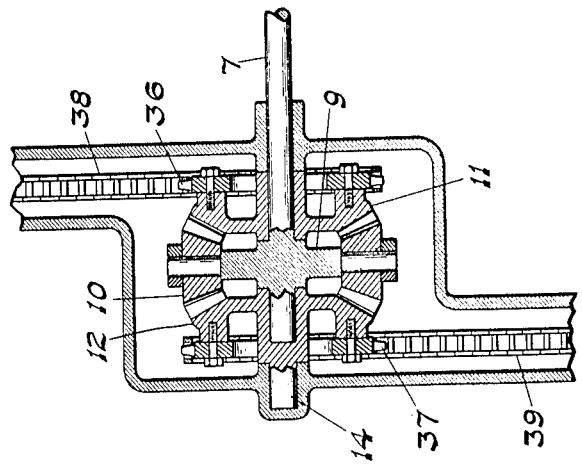
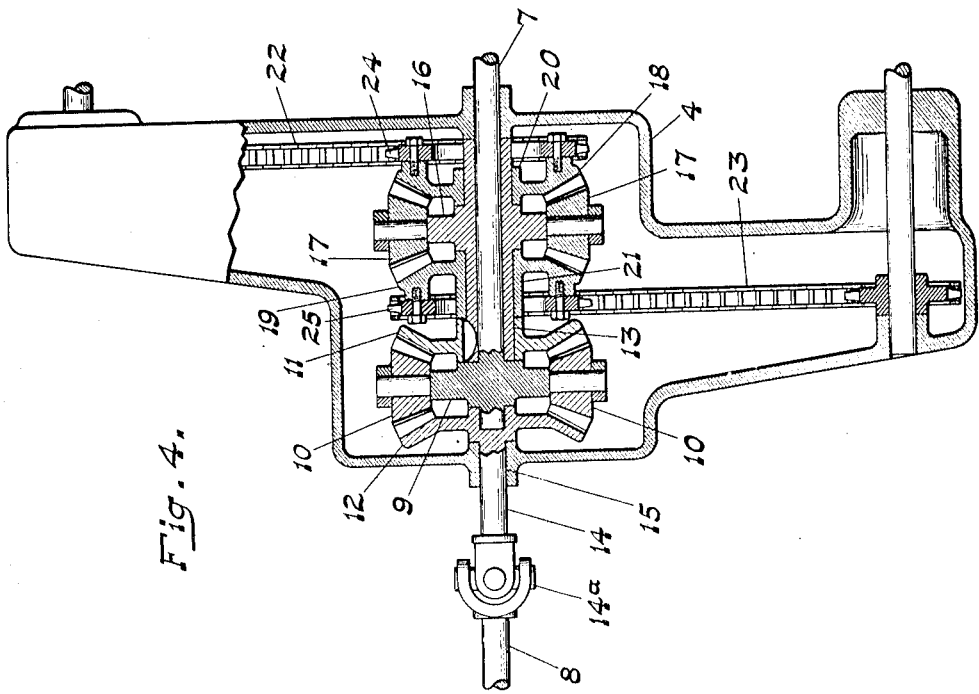

UNITED STATES PATENT OFFICE.

THEODORE H. MILLINGTON, OF PONTIAC, MICHIGAN.

POWER-TRANSMITTING MEANS FOR MOTOR-DRIVEN VEHICLES.

1,273,519.   Specification of Letters Patent.   Patented July 23, 1918.

Application filed March 22, 1916, Serial No. 86,020. Renewed May 11, 1917. Serial No. 168,060.

*To all whom it may concern:*

Be it known that I, THEODORE H. MILLINGTON, a citizen of the United States, residing at Pontiac, Oakland county, and State of Michigan, have invented and discovered certain new and useful Improvements in Power-Transmitting Means for Motor-Driven Vehicles, of which the following is a specification.

The present invention relates to power transmission for motor driven vehicles and consists in the combination and arrangements of elements hereinafter described and fully set forth in the accompanying claims.

The principal object of the invention is to provide such a construction of power transmitting means, particularly in respect to the differential mechanism, as to enable the parts of the various structural and operating units of the car, such as the frame, motor, change speed transmission, and differential, as well as such units themselves in relation to one another to be balanced and also symmetrically arranged in relation to the central longitudinal line of the frame, rendering it possible to place the motor and its connected parts as low as ground clearance will permit, so as to obtain a low center of gravity and the invention particularly aims to accomplish such results in connection with four wheel drive trucks, with a view to obtaining higher speed capacity conjoined with safety, for such type of motor vehicles.

Another object of the invention is to provide a construction wherein the minimum number of universal joints are employed and the several transmission shafts disposed in substantially the plane of the wheel axis to obtain the result of minimum loss of power in the transmission thereof, without interfering with ground clearance.

The primary feature of the invention consists of a differential, particularly a multiple differential, having concentric driving and driven elements with the same so arranged as to drive interiorly from the driving elements outwardly to the driven element. This construction and arrangement of the differential in association with the proper relation of location of the various units and their parts effects the results above described.

With the aforementioned and other objects in view, the invention is shown by way of illustration in the accompanying drawings, wherein—

Figure 1 is a plan view of the chassis of a motor vehicle showing the front and rear wheel driving mechanism, and with parts removed for clearness, Fig. 2, a side elevational view thereof showing the relation of the transmission shafts with respect to the motor vehicle axles, Fig. 3, a front elevational view showing the axle and front wheel drvie, Fig. 4, an enlarged sectional view of the multiple differential gearing, and Fig. 5 illustrates a single differential that may be used for a single pair of wheels only.

Referring to the construction in detail, 1 designates the rear axle housing, 2 the front axle housing with the usual differential differentiating between the two rear wheels therein, 3 the change speed transmission housing, and 4 the housing for the multiple differential gearing.

The engine 5 is suitably mounted on a three-point suspension on the chassis and said engine is located substantially midway of the transverse axis of the frame with the engine shaft 6 thereof disposed substantially in alinement with the propeller or driving shaft 7 and the transmission shaft 8 leading to the axle of the rear wheels respectively.

The shaft 7, which is the prime mover of the multiple differential gearing, carries an arm spider 9, having mounted thereon a pair of idlers 10 that mesh with the bevel-wheels 11 and 12 which are mounted respectively on the sleeve 13 and the shaft 14. Said sleeve 13 is journaled on the shaft 7, and the shaft 14 is journaled in suitable bearings 15 on the differential casing 4 and connects to drive the transmission shaft 8 through the universal joint 14ª. The sleeve 13 has mounted thereon a spider 16 carrying the pair of idlers 17 that mesh with the two bevel wheels 18 and 19 which are constructed with sleeves 20 and 21 journaled on said sleeve 13. While bevel gears are shown as the connecting element of the differential, other forms of such connecting elements might be employed. By this arrangement, the driving and driven elements of the two differential units are concentric to the axis of the driving shaft, and an interior drive from the driving element outward to the driven element is obtained, thus avoiding a peripheral drive construction as is usually employed and avoiding the necessity of offsetting the motor or the transmission shafts to accommodate them to such arrangement of the differential elements.

The front wheel drive from one gearing of the multiple differential consists of the two chains 22 and 23 engaging with the sprockets 24 and 25 on the sleeves 20 and 21 of the differential elements, respectively, and said chains engage a pair of sprockets 26 and 27 mounted on shafts 28 and 29 that are suitably journaled in side extensions 30 of the differential gear casing 4, after the manner shown in Figs. 2 and 4. The pair of shafts 28 and 29 connect by universal joints 31 with the transmission shafts 32 that drive the shafts 33 of the front wheels through the miter-gears 34. While bevel gears are shown other suitable means may be employed between the shafts 32 and 33 in place of that disclosed herein. The steering gear 35 may be of any suitable type.

In the arrangement shown in Fig. 5, a single differential gearing is employed in lieu of the double differential; and in this instance, the spider 9, carrying the idlers 10, is mounted on the shaft 7, as in Fig. 4, and the bevel wheels 11 and 12, engaging said idlers, carry the sprockets 36 and 37 that drive the pair of chains 38 and 39 connecting with the transmission shafts for the axle.

It will be seen from the foregoing, that the several transmission shafts (i. e. 8 and 32), together with the driving shaft 6, are located all substantially in the plane of the car axles, and also that the motor is substantially midway of the transverse axis of the chassis and that the other units of the chassis are balanced and symmetrically disposed; and such arrangement enables the engine to be located partly below the axle center, thus carrying the center of gravity to the lowest practical point. At the same time complete ground clearance for the chassis is provided. This arrangement further enables the omission of many universal joints which would be required for the transmission shafts when the transmission shafts are otherwise disposed. Such relative location of the parts is rendered possible by the interior concentric drive of the elements of the differential.

Owing to the construction, relative arrangement and location of the engine, the drive connections and the means for obtaining the differential front wheel drive and the differentiation between the front pair of wheels and the rear pair, it is possible to apply the front wheel drive construction to a vehicle having the standard form of rear wheel drive.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent, is:

1. In a motor vehicle, in combination with an engine shaft, a driving shaft in substantial continuation of the engine shaft and with its axis co-incident with the axis of said engine shaft, wheel driving transmission shafts, a differential mechanism operatively intermediate the driving shaft and transmission shafts, said differential having the driving and driven elements thereof arranged concentrically of the axis of the driving shaft.

2. In a motor vehicle, in combination with an engine shaft, a driving shaft, wheel driving transmission shafts, a differential mechanism operatively intermediate the driving shaft and transmission shafts, said differential having the elements thereof arranged concentrically of the axes of the driving shaft and engine shaft and having the driving element thereof arranged interiorly of the driven element.

3. In a motor vehicle, in combination with a horizontal engine shaft a horizontal driving shaft, transmission shafts leading to the four wheels of the vehicle and a multiple differential mechanism intermediate the driving shaft and said transmission shafts, each of said differentials having a concentric arrangement of its elements and an internal drive from the driving to the driven elements thereof.

4. In a motor vehicle, in combination with an engine located substantially midway of the transverse axis of the chassis, a horizontal engine shaft, a horizontal driving shaft extending rearwardly from the engine shaft in axial continuation thereof and a multiple differential having its elements concentric of the driving shaft and operatively connected with the driving wheels.

5. In driving mechanism for motor vehicles, the combination of an engine shaft, a driving shaft having its axis extending parallel to the longer axis of the vehicle, a differential concentric with and driven by said driving shaft, a pair of transmission shafts symmetrically disposed to either side of said driving shaft and in substantially the same horizontal plane thereof, and driving connections between the differential and said pair of transmission shafts.

6. In driving mechanism for motor vehicles, an engine located substantially midway of the transverse axis of the chassis, an engine shaft, power transmitting shafts leading to the front wheels and a single power transmitting shaft leading to the rear axle, all of said shafts extending parallel to the axis of the engine shaft and being symmetrically disposed with relation to the vertical plane passing through the same.

7. In a motor vehicle, a power shaft, a differential mechanism mounted upon and concentric to said power shaft and having operative connection with the front wheels of the vehicle, and an extension of said power shaft through the differential in axial continuation of said power shaft having driving connection with the rear wheels of the vehicle.

8. In a motor vehicle, a power shaft, a differential mechanism having its elements mounted on said shaft and concentric thereof and having its driving elements operated therefrom, said differential having one side of its driven elements operatively connected to the rear axle, a second differential also having its elements mounted on and concentrically of the said power shaft and having its driven elements operatively connected with the front wheels, a common sleeve for said differentials journaled on said shaft, the other side of said first differential being operatively connected with the driving element of said second differential through said common sleeve.

9. In a motor vehicle, in combination with an engine, a differential mechanism, a driving shaft for the differential mechanism, a power shaft intermediate the engine and driving shaft, said driving shaft lying in a horizontal plane and extending parallel to the longitudinal axis of the vehicle, said differential mechanism having its elements mounted concentrically of said driving shaft, wheel driving transmission shafts having their axes extending parallel to the longitudinal axis of the vehicle, and means of connection between said differential mechanism and said transmission shafts.

10. In a motor vehicle, in combination with an engine, a change speed transmission to the rear of said engine, a front axle and wheels thereon, a rear axle and wheels thereon, a differential on the rear axle to differentiate between the rear wheels, a multiple differential to the rear of the change speed transmission and having connection with the driven shaft thereof, and adapted to differentiate between the two front wheels and between the front wheels and the rear wheels, a pair of drive connections leading forward from and connected to one differential set of said multiple differential to the front wheels, and parallel to the longitudinal axis of the vehicle, and means of drive connection from the other differential set of the multiple differential to the rear wheel driving shaft.

11. In a motor vehicle, in combination with an engine mounted to the rear of the front axle and with its shaft lying in the horizontal plane of the axle and in the midway vertical plane of the vehicle, a multiple differential to the rear of the engine and operable to differentiate between the two front wheels and between the front pair and rear pair and having its driving shaft in substantial rearward continuation of the engine shaft, a pair of separate transmission shafts for the front wheels extending forwardly from the line of the differential and connected to opposite sides thereof, a single transmission shaft for the rear wheels, extending rearwardly from the differential shaft and in substantial continuation thereof, a differential on the rear axle to which said rear transmission shaft connects, all of said transmission shafts being substantially in the horizontal plane of the axles.

In witness whereof I have hereunto set my hand and seal at Indianapolis, Indiana, this 25th day of February, A. D. nineteen hundred and sixteen.

THEODORE H. MILLINGTON. [L. S.]

Witnesses:
A. C. RICE,
H. P. DOOLITTLE.